(12) United States Patent
Li

(10) Patent No.: US 7,442,464 B2
(45) Date of Patent: Oct. 28, 2008

(54) BATTERY COVER ASSEMBLY MECHANISM FOR PORTABLE ELECTRONIC DEVICE

(75) Inventor: Zhi Li, Shenzhen (CN)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 11/625,496

(22) Filed: Jan. 22, 2007

(65) Prior Publication Data

US 2007/0298318 A1    Dec. 27, 2007

(30) Foreign Application Priority Data

Jun. 23, 2006    (CN) .................. 2006 1 0061316

(51) Int. Cl.
*H01M 2/10* (2006.01)

(52) U.S. Cl. ............................ 429/97; 429/96; 429/100

(58) Field of Classification Search .................. 429/96, 429/97, 98, 99, 100
See application file for complete search history.

(56) References Cited

U.S. PATENT DOCUMENTS

| 2004/0228072 A1* | 11/2004 | Chen et al. .................. 361/600 |
| 2006/0172183 A1* | 8/2006 | Chen et al. .................... 429/97 |
| 2006/0213940 A1* | 9/2006 | Chen et al. .................. 224/269 |

* cited by examiner

*Primary Examiner*—Patrick Ryan
*Assistant Examiner*—Muhammad Siddiquee
(74) *Attorney, Agent, or Firm*—Steven M. Reiss

(57) ABSTRACT

A battery cover assembly mechanism (200) of a portable electronic device (100) includes a housing (10), a battery cover (20), and an elastic member (30) mounted on the housing. The housing has at least one latching portion (126). The battery cover includes at least one latching block (28), a first stopper (24), and a second stopper (26). The elastic member includes a first elastic portion (34) and a second elastic portion (36). In assembly, the latching block of the battery cover is engaged with the latching portion of the housing, and the first stopper and the second stopper respectively engage with the first elastic portion and the second elastic portion. Therefore, the battery cover is stably attached to the housing.

20 Claims, 15 Drawing Sheets

BATTERY COVER ASSEMBLY MECHANISM FOR PORTABLE ELECTRONIC DEVICE

BACKGROUND OF THE INVENTION

1. Field of the Invention

The present invention generally relates to battery cover assembly mechanisms and, more particularly, to a battery cover assembly mechanism for use in a portable electronic device.

2. Description of Related Art

Batteries are widely used in portable electronic devices, such as personal digital assistants (PDAs), mobile phones and so on. Conventional batteries are attachably received in housings of the portable electronic devices, and battery covers are designed to connect to the housings so as to enclose and protect the batteries. The batteries have to be replaced by removing the battery covers when the batteries are, for example, damaged, exhausted, and/or in need of recharging or replacement.

Referring to FIGS. 14 and 15, a typical battery cover assembly mechanism 300 includes a housing 40 and a battery cover 50. The housing 40 has a battery compartment 42 defined in a lower surface portion 44 thereof. The battery compartment 42 is used to receive a battery (not shown). A stopper 442 is disposed on a rear part of the lower surface portion 44, and has a trapezium-shaped cross-section. The housing 40 has two opposite sidewalls 46. Each sidewall 46 defines two opening 462. A latching portion 48 is positioned adjacent to an opening 462. The latching portion 48 has a protruding wall 482, and a slot 484 communicating with a corresponding opening 462. The battery cover 50 has four spaced latching blocks 52 formed on two sidewalls 56 thereof. Each latching block 52 includes an inserting tab 522 and a fastened tab 524. The inserting tab 522 and the fastened tab 524 are oriented perpendicular to each other. A resisting portion 54 is formed on an inside surface 542 of the battery cover 50.

In assembly, the latching blocks 52 are respectively received in a given opening 462, and the resisting portion 54 is close to the stopper 442. Then, the battery cover 50 is pressed and pushed forward so that the resisting portion 54 runs/extends over the stopper 442, and the inserting tab 522 of each latching blocks 52 slide into a corresponding slot 484. Accordingly, the battery cover 50 is attached to the housing 40 by means of the stopper 442 and the latching portions 48.

However, if the overlap of the resisting portion 54 and the stopper 442 is small, the battery cover 50 may easily swing. If the overlap of the resisting portion 54 and the stopper 442 is large enough, the friction produced between the resisting portion 54 and the stopper 442 during insertion and removal of the battery cover 50 can be rather significant. Therefore, after repeated use (i.e., insertion/removal cycles), the resisting portion 54 and the stopper 442 might easily wear out.

Therefore, a new battery cover assembly mechanism is desired in order to overcome the above-described problems.

SUMMARY OF THE INVENTION

In one embodiment thereof, a battery cover assembly mechanism, used in a portable electronic device, includes a housing, a battery cover, and an elastic member mounted on the housing. The housing has at least one latching portion. The battery cover includes at least one latching block, a first stopper, and a second stopper. The elastic member includes a first elastic portion and a second elastic portion. The latching block of the battery cover is engaged with the latching portion of the housing, and the first stopper and the second stopper are separately engaged with the first elastic portion and the second elastic portion.

Other advantages and novel features will become more apparent from the following detailed description when taken in conjunction with the accompanying drawings.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the present battery cover assembly mechanism. Moreover, in the drawings, like reference numerals designate corresponding parts throughout the several views.

DETAILED DESCRIPTION OF THE INVENTION

Figure 1:
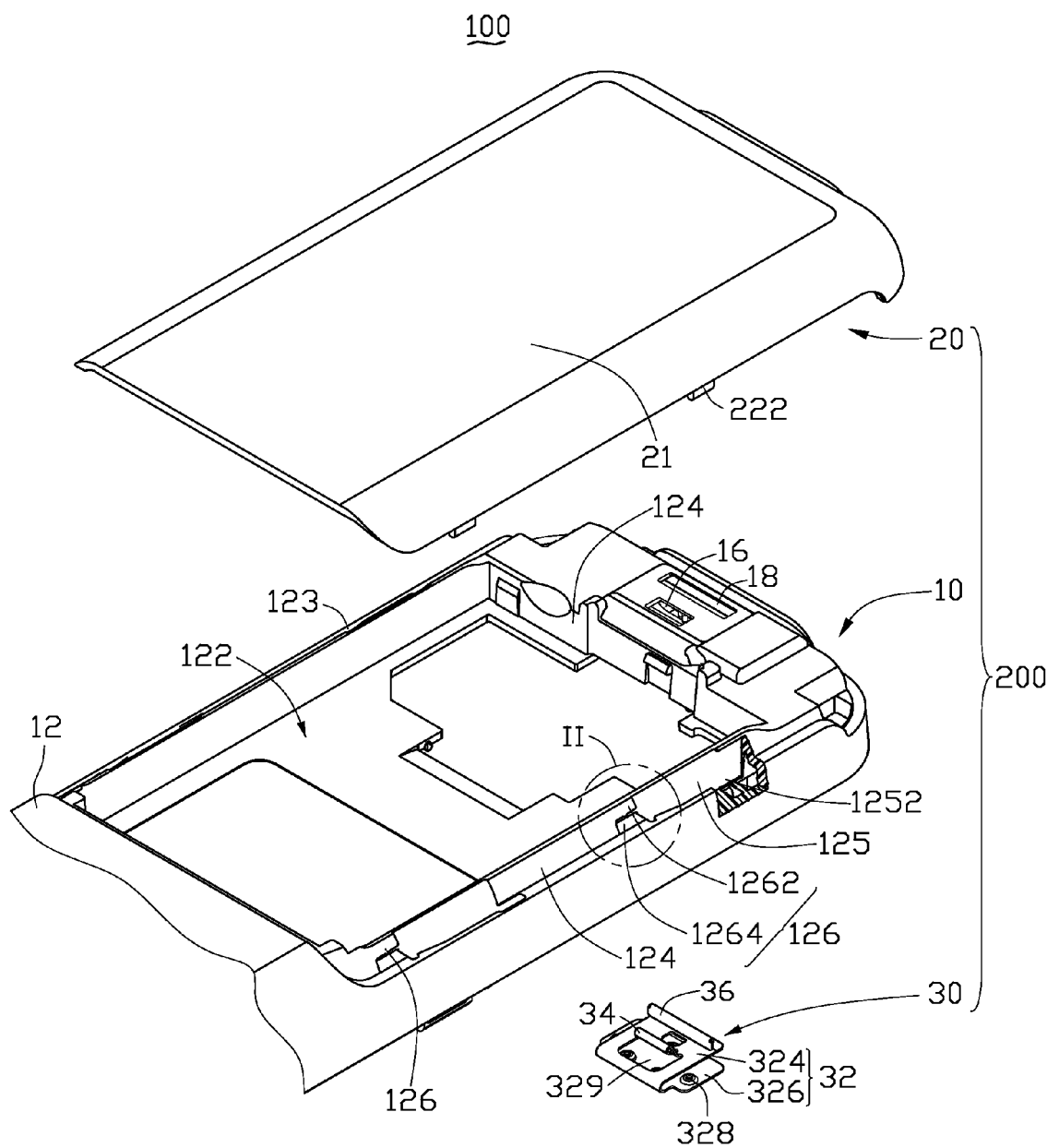
FIG. 1 is an exploded, isometric view of a portable electronic device, incorporating a battery cover assembly mechanism, in accordance with a preferred embodiment.

Referring now to FIG. 1, the battery cover assembly mechanism 200 is shown as provided in a portable electronic device 100, such as a mobile phone or PDA, according to a first preferred embodiment, for the purposes of illustrating an exemplary application of battery cover assembly mechanism 200. The battery cover assembly mechanism 200 includes a housing 10 of the portable electronic device 100, a battery cover 20, and an elastic member 30.

Figure 2:
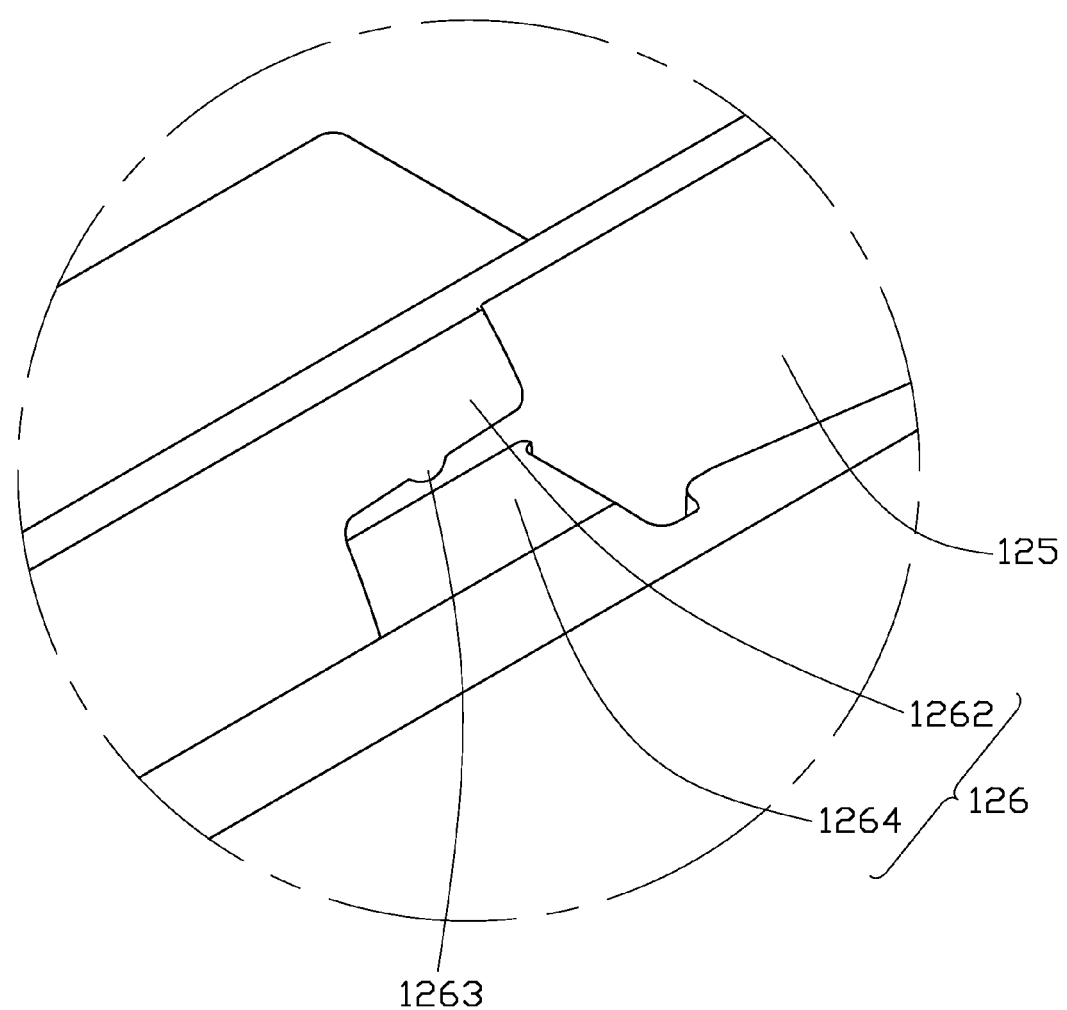
FIG. 2 is an enlarged view of a circled portion II of FIG. 1.

The housing 10 acts as a rear cover for the portable electronic device 100 and serves to retain the electronic modules (not shown) associated with the portable electronic device 100. A substantially rectangular battery compartment 122 is defined in an upper side 12 of the housing 10 for accommodating a battery (not shown). The battery compartment 122 is surrounded by two longitudinal walls 123 and two transverse walls 124. The two longitudinal walls 123 are opposite to each other, and the two transverse walls 124 are opposite to each other. Each longitudinal wall 123 defines two spaced openings 125 so that the longitudinal wall 123 is divided into three parts. A sliding groove 1252 is defined in the bottom of the opening 125. Each longitudinal wall 123 has two latching portions 126 positioned on the side of a given opening 125. The latching portion 126 is made up of a protruding wall 1262, and a slot 1264 communicating with a given opening 125. Referring to FIG. 2, a semicircular protrusion 1263 extends from an inside surface of the protruding wall 1262.

Figure 3:
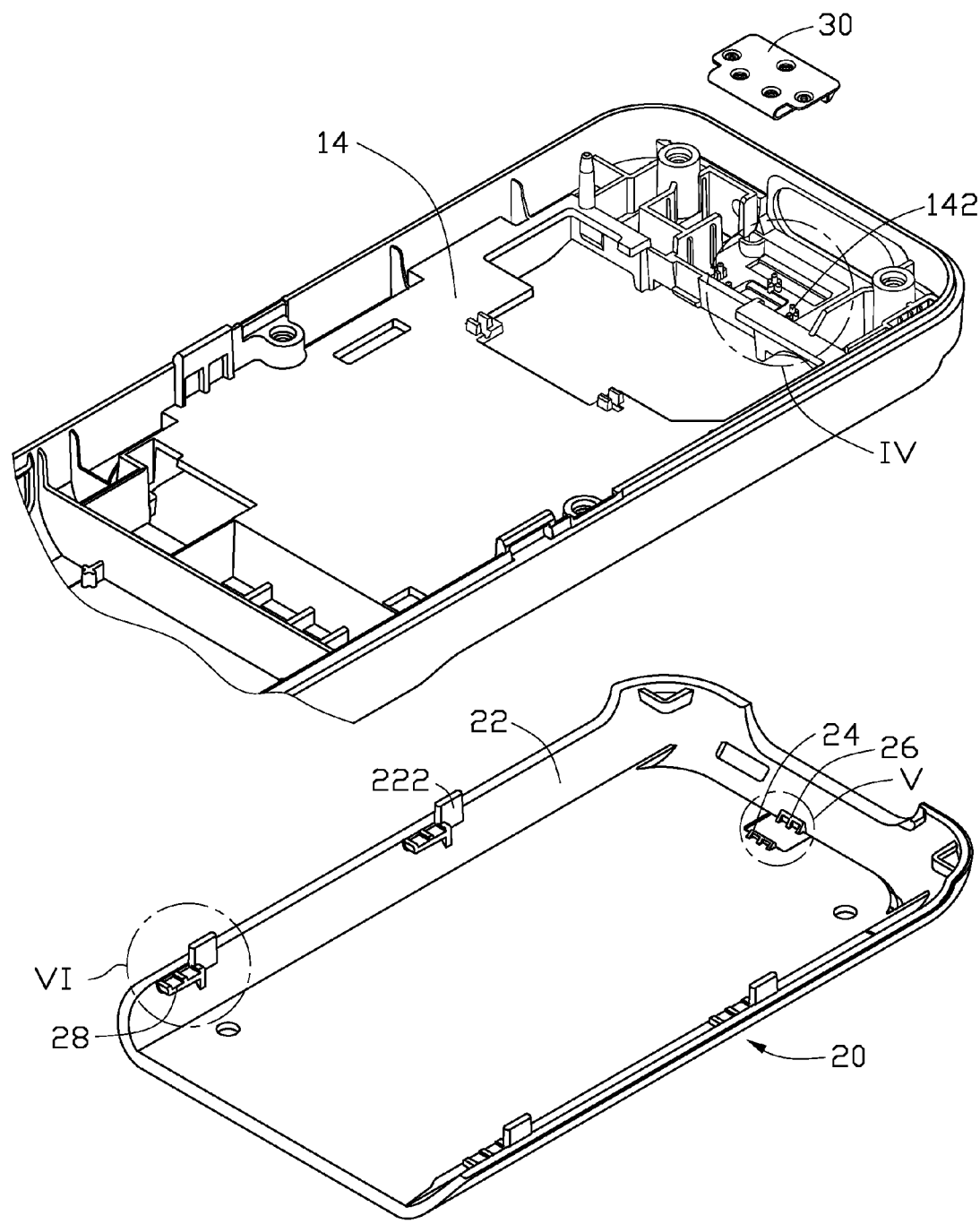
FIG. 3 is similar to FIG. 1, but showing another aspect.
Figure 4:
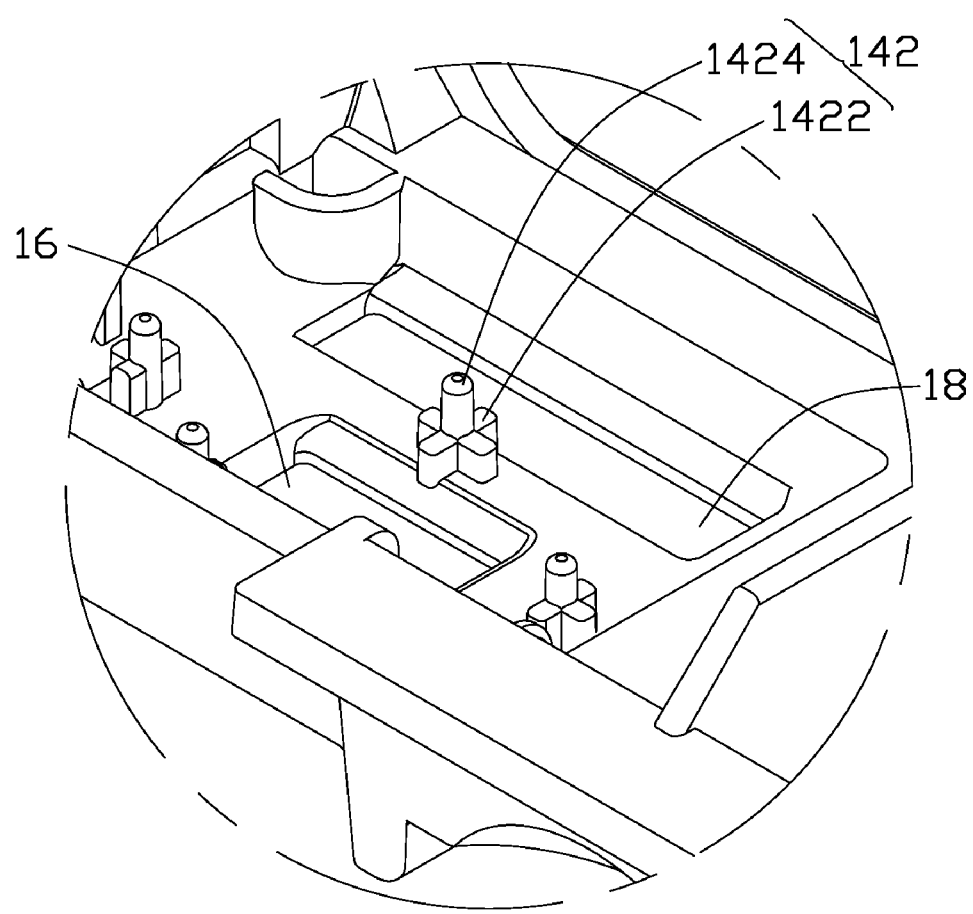
FIG. 4 is an enlarged view of a circled portion IV of FIG. 3.

Referring to FIGS. 3 and 4, the housing 10 has a lower side 14 on an opposite side of the upper side 12. A first hole 16 and a second hole 18 are defined in a rear portion of the housing 10. The first hole 16 and the second hole 18 extend through the upper side 12 and the lower side 14 of the housing 10. The first hole 16 and the second hole 18 are substantially rectangular and face each other. Several positioning pins 142 perpendicularly extend from the lower side 14 of the housing 10 and are positioned adjacent to the first hole 16 and the second hole 18. Each positioning pin 142 has a base 1422 and a column 1424 extending from the base 1422.

Figure 5:
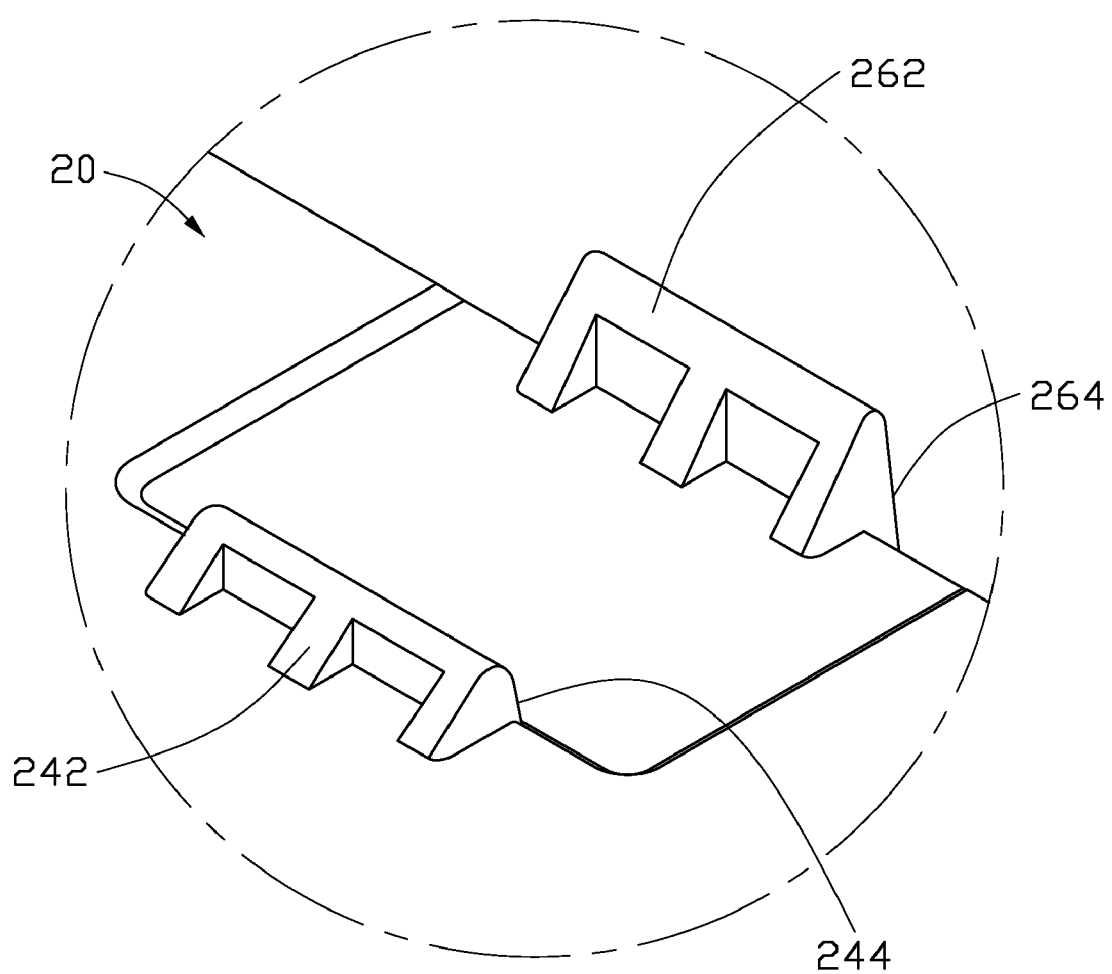
FIG. 5 is an enlarged view of a circled portion V of FIG. 3.
Figure 6:
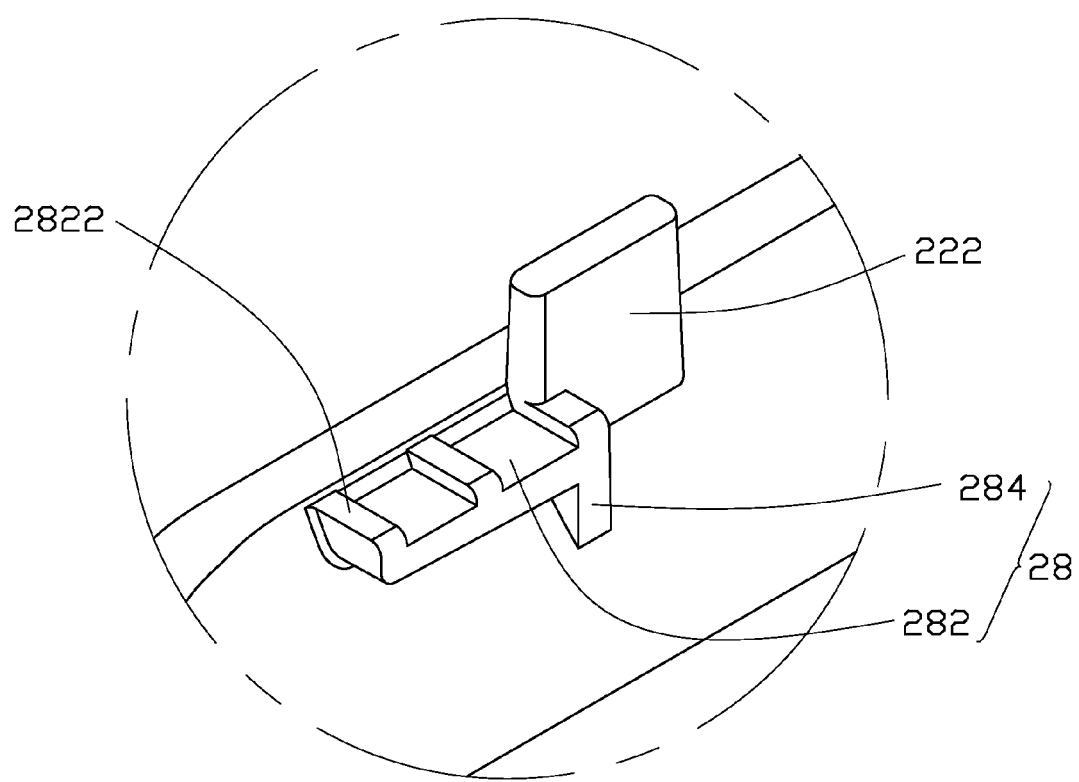
FIG. 6 is an enlarged view of a circled portion VI of FIG. 3.

The battery cover 20 includes a main body 21 and two opposite sidewalls 22. The main body 21 has a first stopper 24 and a second stopper 26 extending from a top portion of an inside surface thereof, with the second stopper 26 being positioned closer to the distal edge of the top portion than the first stopper 24. The first stopper 24 and the second stopper 26 are separately positioned relative to the first hole 16 and the second hole 18, respectively. The size of the first stopper 24 is smaller than that of the second stopper 26. The second stopper 26 is taller (i.e., of greater height) than the first stopper 24 so that the second stopper 26 may contact the elastic member 30 first. Referring to FIG. 5, the first stopper 24 has a front surface 242, a back surface 244, and an arcuate surface (not labeled) connecting the front surface 242 to the back surface 244. The second stopper 26 has a front surface 262, a back surface 264, and an arcuate surface (not labeled) connecting the front surface 262 to the back surface 264. Two latching blocks 28 are positioned on each respective sidewall 22 of the housing 10. Referring to FIG. 6, the latching block 28 includes an inserting tab 282 and a fastened tab 284. The inserting tab 282 may be received in the corresponding slot 1264 of the housing. The fastened tab 284 is oriented perpendicular to the inserting tab 282. Several ridges 2822 protrude from a surface of a given inserting tab 282 so that the strength of the given inserting tab 282 is increased. A positioning tab 222 is fixed beside a corresponding latching block 28. The positioning tabs 222 may be received in a corresponding slot 1264.

Figure 7:
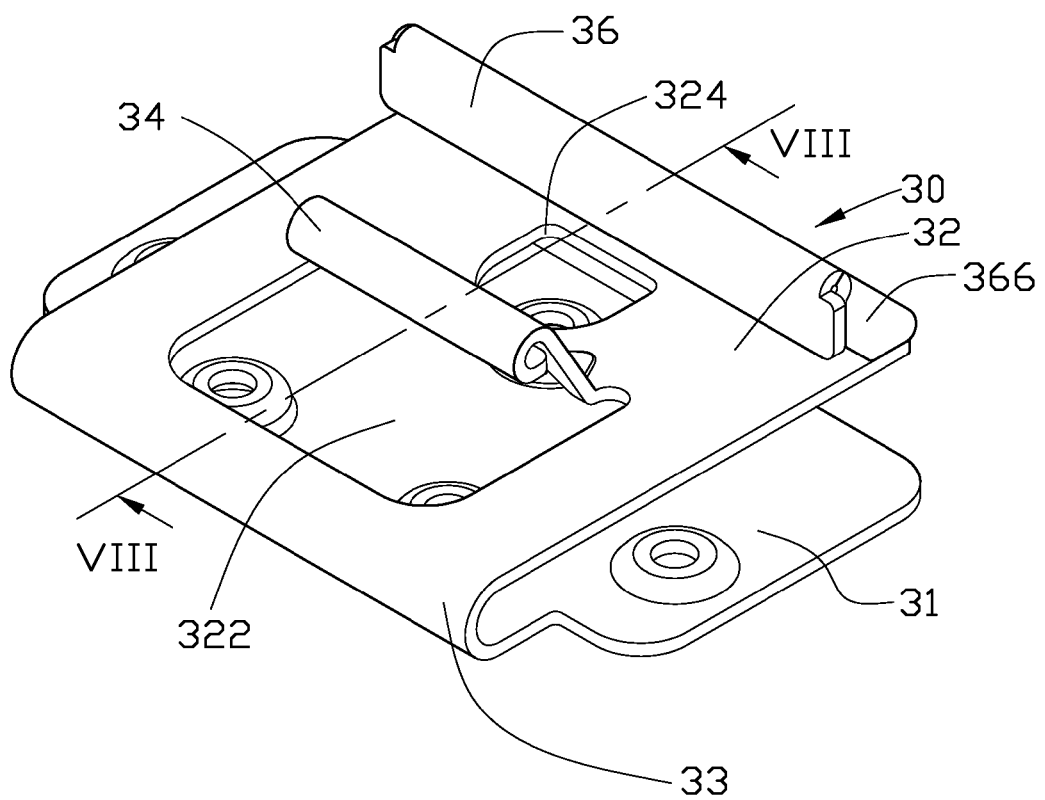
FIG. 7 is an isometric view of the elastic member shown in FIG. 1.
Figure 8:
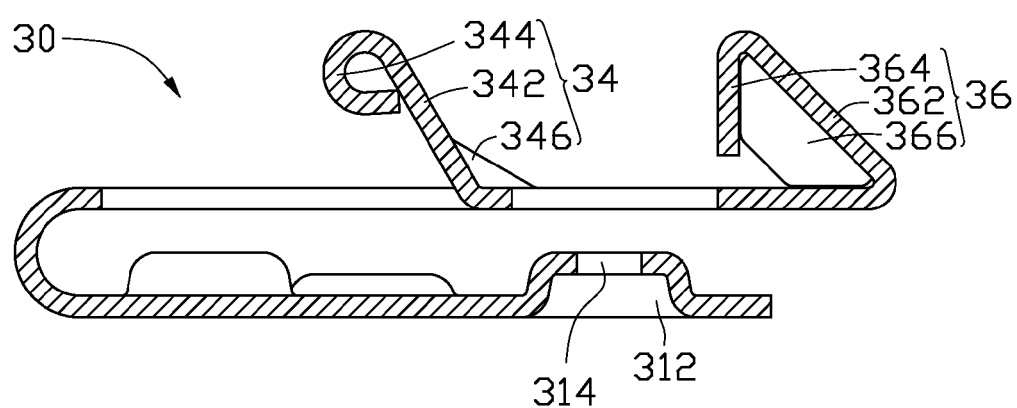
FIG. 8 is an isometric, cut-away view of the elastic member taken along the VIII-VIII line in FIG. 7.

Referring to FIGS. 7 and 8, the elastic member 30 may, advantageously, be made of a durable, resilient metal such as iron, steel, or copper. The elastic member 30 includes a fixing board 31, a folded board 32, and a U-shaped junction portion 33, connecting the fixing board 31 to the folded board 32. An outside surface of the fixing board 31 is partly recessed to form/define several receiving holes 312. A positioning hole 314 is defined in the bottom of each receiving hole 312 for receiving a corresponding column 1424 of a corresponding positioning pin 142.

The folded board 32 has a first elastic portion 34, with a second elastic portion 36 extending therefrom. The first elastic portion 34 and the second elastic portion 36 have an essentially identical height. The first elastic portion 34 and the second elastic portion 36 may respectively be received in the first hole 16 and the second hole 18. A big hole 322 and a small hole 324 are defined in the folded board 32 so that the corresponding positioning pins 142 of the housing 10 may pass through the folded board 32 and then be engaged in a given positioning hole 314 of the fixing board 31 during assembly.

The first elastic portion 34 includes an extending plate 342 and a ridge 346. The extending plate 342 extends from the folded board 32 at an acute angle (e.g., about 50°-65°). A free end of the extending plate 342 is advantageously bent to be a barrel 344, facing the folded board 32 and thereby promoting easy insertion/removal due to its rounded barrel shape. The ridge 346 connects with the extending plate 342 and the folded board 32 so as to support the extending plate 342.

The second elastic portion 36 is longer/wider (advantageously, by a factor of about 1.5-2) than the first elastic portion 34. The second elastic portion 36 has a stretch plate 362, first extending from the folded board 32 with an acute angle (e.g., about 40°-50°). The stretch plate 362 is further bent to form a vertical plate 364 and two stiffened plates 366. The vertical plate 364 is perpendicular to the folded board 32. The two stiffened plates 366 are positioned on the two sides of the stretch plate 362, for supporting the vertical plate 364 when pressure is applied to the second elastic portion 36.

Figure 9:
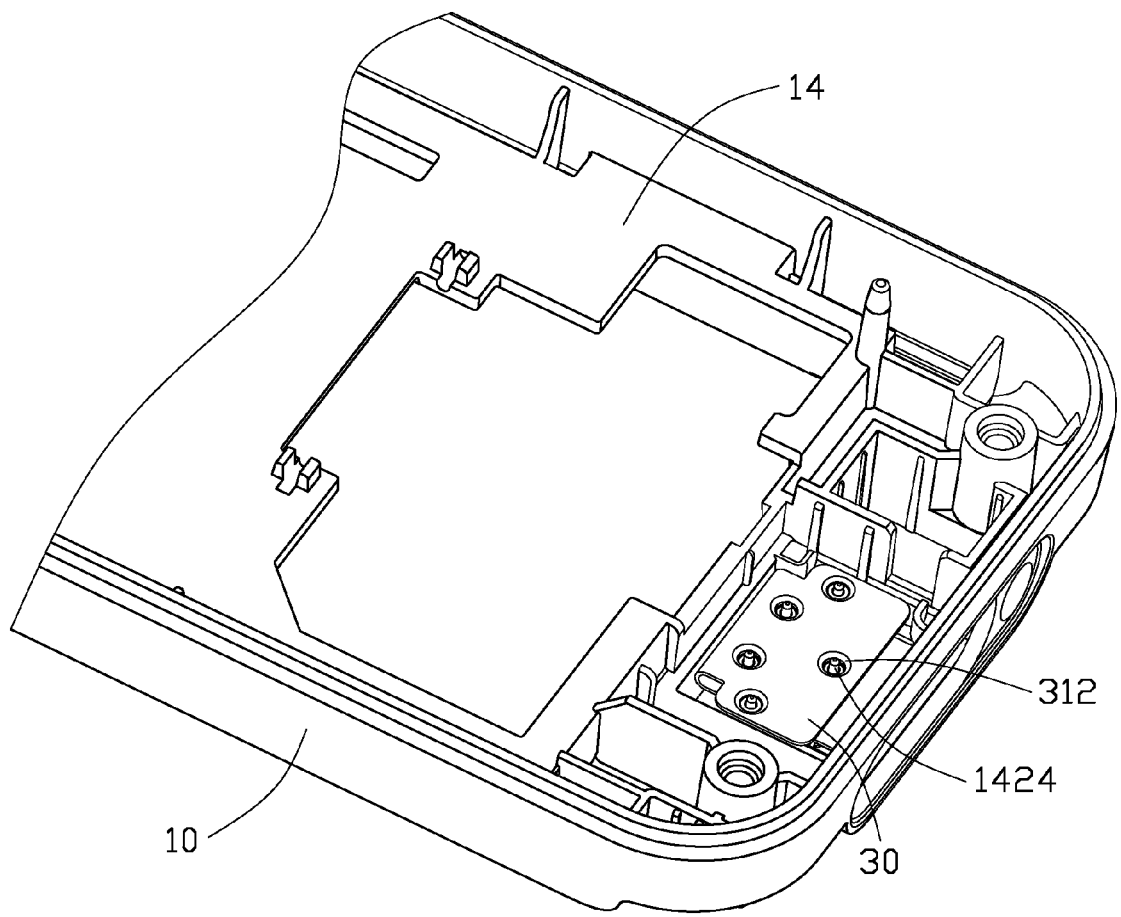
FIG. 9 is similar to FIG. 3, but showing the elastic member mounted on the housing.
Figure 10:
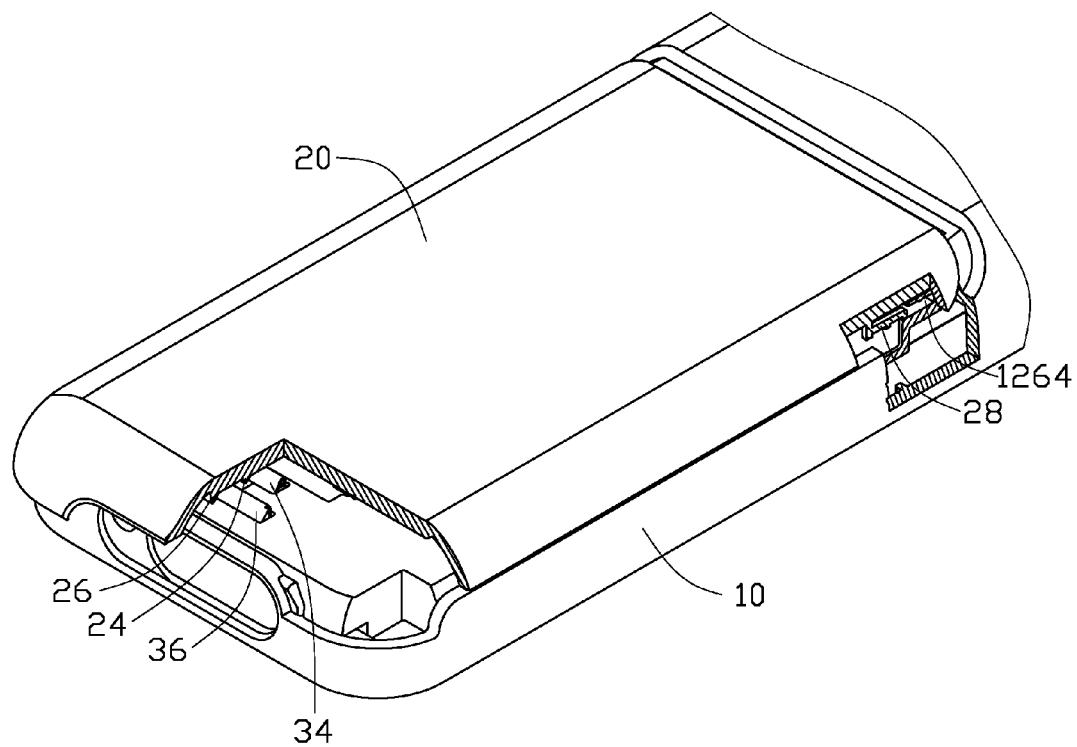
FIG. 10 is an isometric, cut-away view of the battery cover latching mechanism of FIG. 1, in assembly, showing the battery cover mounted on the housing in a first position.
Figure 11:
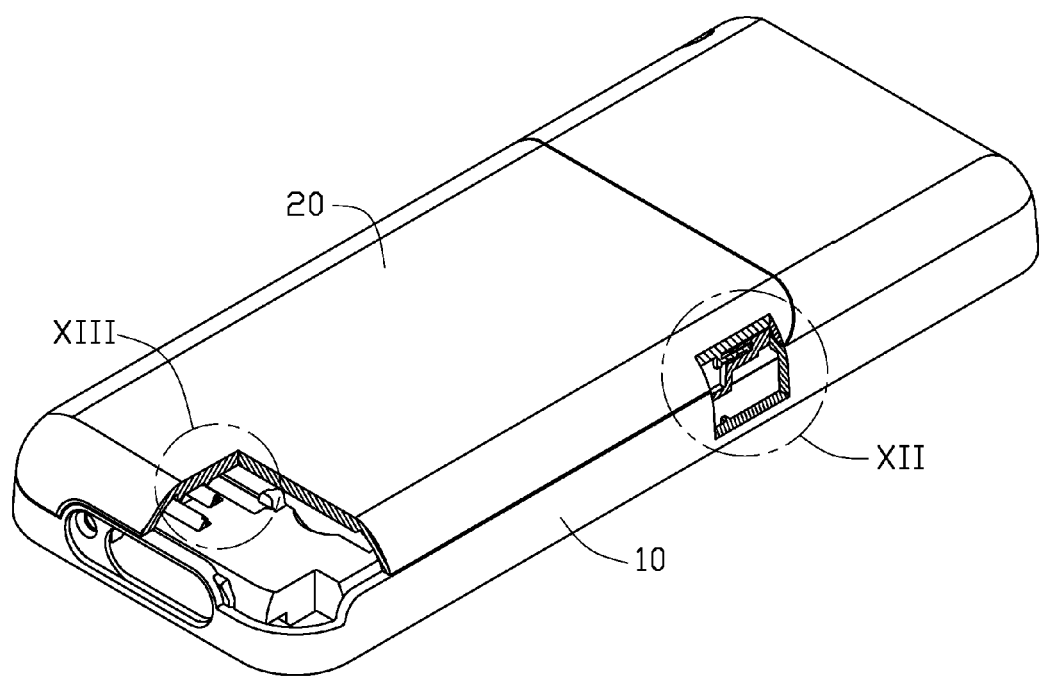
FIG. 11 is similar to FIG. 10, but showing the battery cover mounted on the housing in a second position.
Figure 12:
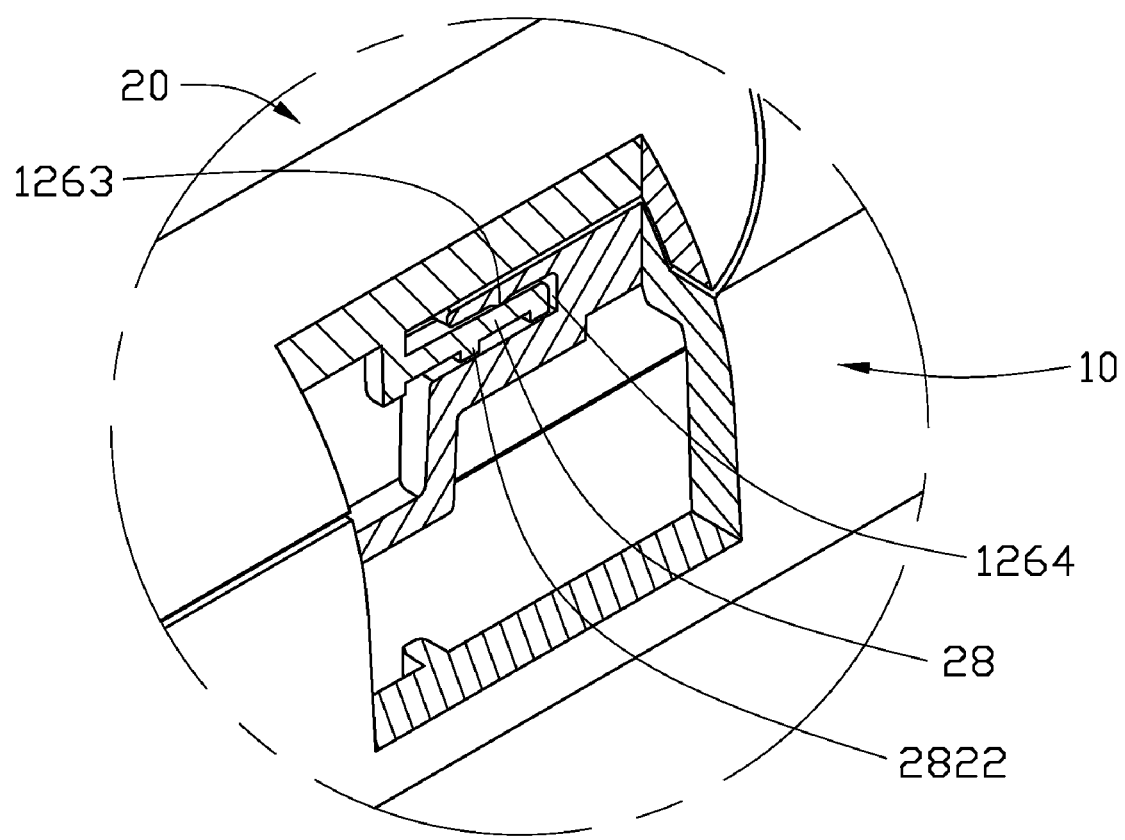
FIG. 12 is an enlarged view of a circled portion XII of FIG. 11.
Figure 13:
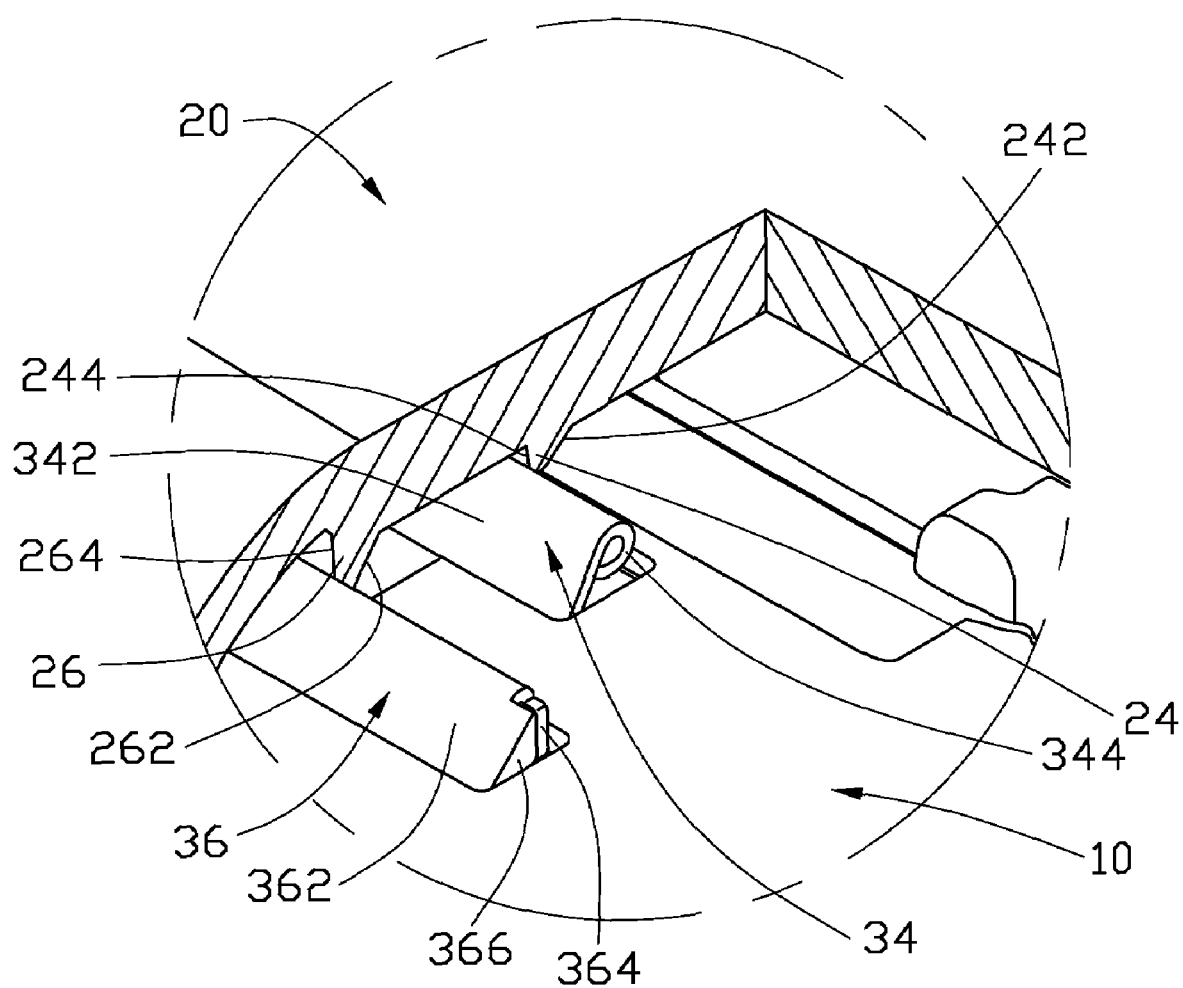
FIG. 13 is an enlarged view of a circled portion XIII of FIG. 11.
Figure 14:
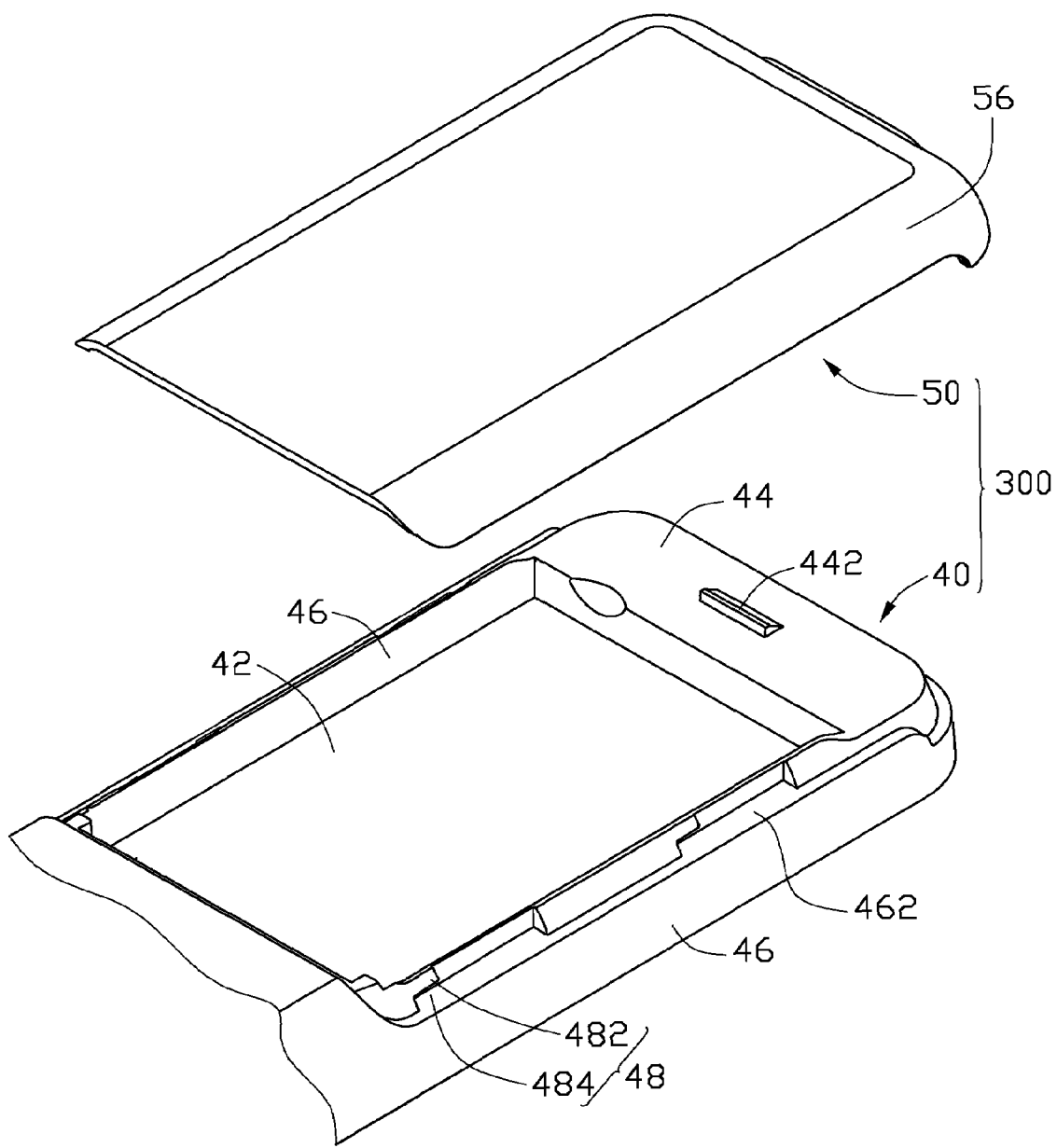
FIG. 14 is an exploded, schematic view of a typical portable electronic device, incorporating a battery cover assembly mechanism.
Figure 15:
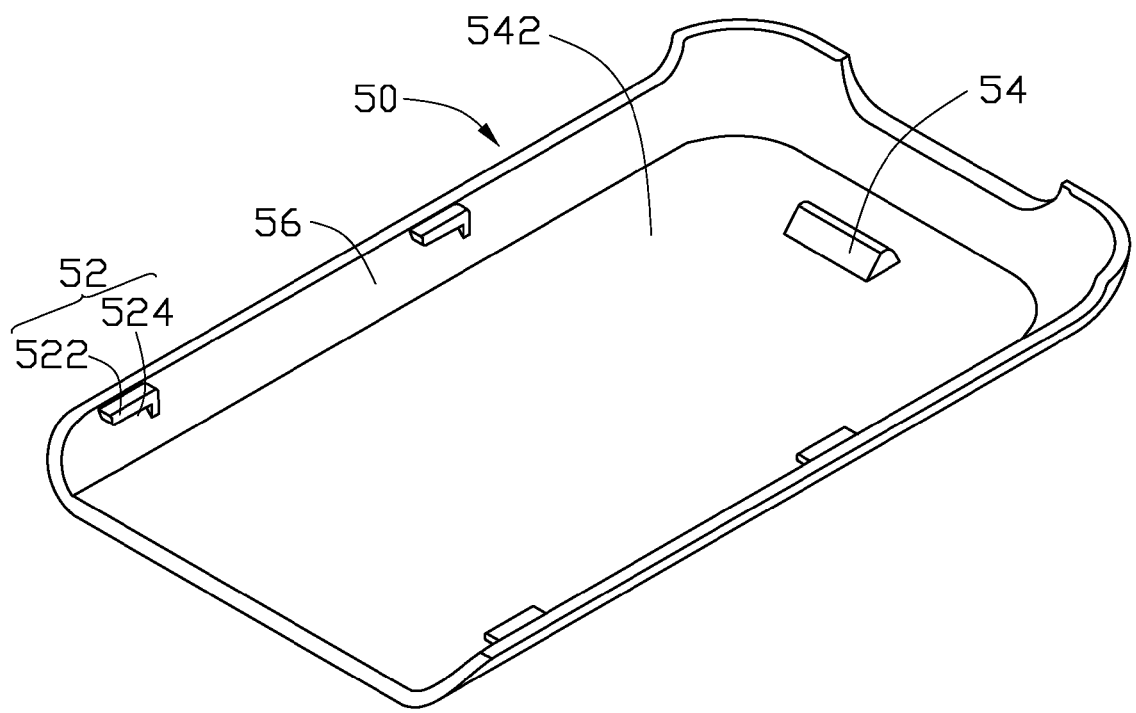
FIG. 15 is a schematic view of a battery cover shown in FIG. 14.

In assembly of the elastic member 30 to the housing 10, referring to FIG. 9, the first elastic portion 34 and the second elastic portion 36 of the elastic member 30 respectively pass/extend through the big hole 322 and the small hole 324 from the lower side 14 of the housing 10. At the same time, the positioning pins 142 pass/extend through the folded board 32, and the columns 1424 are respectively inserted into a given positioning hole 314. The first elastic portion 34 and the second elastic portion 36 are exposed from the upper side 12 of the housing 10. Then, the ends of each of the columns 1424 are advantageously melted, welded, and/or soldered (i.e., metallurgically attached) to allow permanent attachment thereof to the elastic member 30.

In assembly of the battery cover 20 to the housing 10, referring to FIGS. 10 to 13, firstly, the battery is put in the battery compartment 122 of the housing 10. Secondly, the latching blocks 28 of the battery cover 20 are received in a corresponding opening 125 of the sidewall 22 and aimed at a corresponding slot 1264. At the same time, the positioning tabs 222 are inserted in a given sliding groove 1252, and the first elastic portion 34 is located between the first stopper 24 and the second stopper 26. Then, the battery cover 20 is pushed forward to engage with the housing 10. The front surface 262 of the second stopper 26 resists the second elastic portion 36 and climbs/rises up along the stretch plate 362 of the second elastic portion 36. Therefore, the second elastic portion 36 is pressed by means of the second stopper 26, and the folded board 32 is bent down. As a result, the first elastic portion 34 is forced downwardly with the folded board 32, so that the first stopper 24 may easily stride over the highest point of the first elastic portion 34. The inserting tabs 282 of each of the latching blocks 28 become engaged with a corresponding slot 1264. When the first stopper 24 and the second stopper 26 separately slip over the first elastic portion 34 and the second elastic portion 36, respectively, the folded board 32 of the elastic member 30 rebounds to its original configuration, and the first elastic portion 34 and the second elastic portion 36 return to their original positions. The back surface 244 of the first stopper 24 resists the barrel 344 of the first elastic portion 34. Meanwhile, the back surface 264 of the second stopper 26 resists the vertical plate 364 of the second elastic portion 36. Accordingly, the battery cover 20 is firmly attached to the housing 10 by the above engagement between the battery cover 20 and the housing 10 and the resistance of the elastic member 30.

When the battery cover 20 needs to be detached from the housing 10, the main body 21 of the battery cover 20 is pushed away from the housing 10 by an outside force. The first stopper 24 lifts up and slips over the barrel 344 of the first elastic portion 34, due to the rounded nature of the barrel 344 (i.e., the barrel curvature translates any sliding movement into a horizontal (sliding) vector and a vertical (rising) vector). Due to the rising of the first stopper 24 in its movement over the barrel 344, the second stopper 26 also rises up along the stretching plate 362 of the second elastic portion 36 and strides over it. The inserting tabs 282 of the battery cover 20 are released from a corresponding slot 1264 of the housing 10. Therefore, the battery cover 20 may be removed from the housing 10.

It should be understood that it is easier to assemble the battery cover 20 to the housing 10 than to detach the battery cover 20 from the housing 10 by means of the elastic member 30. Specifically, it is easier during assembly to push the second stopper 26 up the incline offered by the stretch plate 362 of the second elastic portion 36 (in part because the elastic member 30 tends to flex downwardly significantly in such a process, given the relative height of the back surface 264 of the second stopper 26) than it is during disassembly for the first stopper 24 to move over the barrel 344. Furthermore, the second stopper 26 is higher and stronger than the first stopper 24, and the first elastic portion 34 has a height essentially identical to the second elastic portion 36. Therefore, the second stopper 26 would firstly resist the elastic member 30 and endure the main force during assembly so that the friction produced between the first stopper 24 and the first elastic portion 34 may be reduced. As a result, the operational lifetime of the battery cover 20 can be prolonged.

In alternative embodiments, the latching blocks 28 of the battery cover 20 may be replaced with a locking pin protruding from an end of the battery cover 20, which is opposite to the stoppers 24, 26. Accordingly, the latching portions 126 can be replaced by a locking hole defined in the lower sidewall 124, which is opposite to the elastic member. The locking pin would be engaged with the locking hole in assembly.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover assembly mechanism for use in a portable electronic device, comprising:
   a housing having at least one latching portion, the at least one latching portion being integrally formed with the housing;
   a battery cover including at least one latching block, a first stopper, and a second stopper, each latching block corresponding to a respective latching portion, the at least one latching block, the first stopper, and the second stopper being integrally formed with the battery cover; and
   an elastic member mounted on the housing, the elastic member including a first elastic portion and a second elastic portion;
   wherein each latching block of the battery cover engages with a corresponding latching portion of the housing, the first stopper engages with the first elastic portion, and the second stopper engages with the second elastic portion, the battery cover thereby being stably attached to the housing.

2. The battery cover assembly mechanism as claimed in claim 1, wherein each latching block of the battery cover includes a corresponding inserting tab, and each latching portion of the housing has a slot configured for receiving a respective inserting tab.

3. The battery cover assembly mechanism as claimed in claim 2, wherein the battery cover further includes a corresponding positioning tab fixed beside a given latching block, the housing has a respective opening defined beside a corresponding latching portion, the respective opening communicates with the corresponding slot and is used for receiving the corresponding latching block, a respective sliding slot is defined in the bottom of a given opening, and the respective sliding slot is used for receiving the corresponding positioning tab of the battery cover.

4. The battery cover assembly mechanism as claimed in claim 2, wherein each latching portion further comprises a corresponding protruding wall, and each protruding wall locks a corresponding inserting tab of the latching block.

5. The battery cover assembly mechanism as claimed in claim 4, wherein a corresponding protrusion extends from a given protruding wall and faces the corresponding slot of the latching portion.

6. The battery cover assembly mechanism as claimed in claim 2, wherein each inserting tab has at least one ridge.

7. The battery cover assembly mechanism as claimed in claim 1, wherein the number of the latching blocks of the battery cover is four, and the number of the latching portions of the housing is four.

8. The battery cover assembly mechanism as claimed in claim 1, wherein the second stopper of the battery cover has a height that is greater than that of the first stopper of the battery cover, and the first elastic portion and the second elastic portion of the elastic member have an essentially identical height.

9. The battery cover assembly mechanism as claimed in claim 1, wherein the elastic member further includes a fixing board, a folded board, and a junction portion connecting the fixing board to the folded board, and the first elastic portion and the second elastic portion extend from the folded board.

10. The battery cover assembly mechanism as claimed in claim 9, wherein the housing has a first hole for receiving the first elastic portion of the elastic member and has a second hole for receiving the second elastic portion of the elastic member.

11. The battery cover assembly mechanism as claimed in claim 10, wherein the fixing board has several positioning holes defined therein respectively proximate one of the first hole and the second hole, the housing has several positioning pins disposed thereon around the first hole and the second hole accordingly, and the respective positioning pins are alignable and engageable with the respective positioning holes of the fixing board.

12. The battery cover assembly mechanism as claimed in claim 11, wherein the folded board has at least one hole defined therein, and each hole in the folded board receives a corresponding positioning pin therein so that the corresponding positioning pins pass through the folded board and are engaged therewith via a given positioning hole of the fixing board.

13. The battery cover assembly mechanism as claimed in claim 9, wherein the first elastic portion includes an extending plate and a ridge, the extending plate extends from the folded board with an acute angle, and a free end of the extending plate has a barrel form.

14. The battery cover assembly mechanism as claimed in claim 9, wherein the second elastic portion is longer than the first elastic portion and includes a stretch plate, the stretch plate extends from the folded board at an acute angle, the stretch plate is bent to form a vertical plate perpendicular to the folded board, and two stiffened plates are respectively positioned on the two sides of the stretch plate.

15. A battery cover assembly mechanism for a portable electronic device, comprising:
   a housing having at least one insertion tab;
   a battery cover including at least one slot, a first stopper, and a second stopper, the first stopper and the second stopper extending from a top portion of an inside surface of the battery cover; and
   an elastic member attached to the housing, the elastic member including a first elastic portion engaging the first stopper of the battery cover, and a second elastic portion engaging the second stopper of the battery cover;
   wherein, during insertion of the battery cover onto the housing, the first elastic portion and the second elastic portion of the elastic member are pressed down by the first stopper and the second stopper of the battery cover, the elastic member returns to its original configuration when the first stopper travels over the first elastic portion and the second stopper extends over the second elastic portion, and a given inserting tab engages with a corresponding slot, thereby stably mounting the battery cover on the housing.

16. The battery cover assembly mechanism as claimed in claim 15, wherein the battery cover further includes a positioning tab fixed beside the latching block, the housing has an opening defined beside the latching portion, the opening communicates with the slot and is used for receiving the latching block, a sliding slot is defined in the bottom of the opening, and the sliding slot is used for receiving the positioning tab of the battery.

17. The battery cover assembly mechanism as claimed in claim 15, wherein the second stopper of the battery cover has a height that is greater than that of the first stopper of the battery cover, and the first elastic portion and the second elastic portion of the elastic member have essentially identical height.

18. A portable electronic device having a battery cover assembly mechanism, the battery cover assembly mechanism including:
   a housing having at least one latching portion;
   a battery cover including at least one latching block, a first stopper, and a second stopper, the latching block corresponding to the latching portion, the at least one latching block extending from a sidewall of the battery cover; and
   an elastic member mounted on a rear portion of the housing and being spaced from the latching portion, the elastic member including a first elastic portion corresponding to the first stopper of the battery cover, and a second elastic portion corresponding to the second stopper of the battery cover;
   wherein the latching block of the battery cover engages the latching portion of the housing, the first stopper engages the first elastic portion, and the second stopper engages the second elastic portion, the battery cover thereby being stably attached to the housing.

19. The portable electronic device as claimed in claim 18, wherein the elastic member further includes a fixing board, a folded board, and a junction portion connecting the fixing board to the folded board, and the first elastic portion and the second elastic portion extend from the folded board.

20. The portable electronic device as claimed in claim 19, wherein the second elastic portion is longer than the first elastic portion and includes a stretch plate, the stretch plate extends from the folded board at an acute angle, the stretch plate is bent to form a vertical plate perpendicular to the folded board, and two stiffened plates are respectively positioned on the two sides of the stretch plate.

* * * * *